United States Patent
Leem

(10) Patent No.: US 9,653,208 B2
(45) Date of Patent: May 16, 2017

(54) WIRELESS POWER RECEIVER AND METHOD OF MANUFACTURING THE SAME

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 729 days.

(21) Appl. No.: 14/103,327

(22) Filed: Dec. 11, 2013

(65) Prior Publication Data

US 2014/0167521 A1 Jun. 19, 2014

(30) Foreign Application Priority Data

Dec. 13, 2012 (KR) .................. 10-2012-0145645

(51) Int. Cl.

| | | |
|---|---|---|
| H01F 27/42 | (2006.01) | |
| H01F 38/14 | (2006.01) | |
| H01F 41/00 | (2006.01) | |
| H02J 5/00 | (2016.01) | |
| H04B 5/00 | (2006.01) | |
| H01Q 7/00 | (2006.01) | |

(Continued)

(52) U.S. Cl.
CPC ............. *H01F 38/14* (2013.01); *H01F 41/00* (2013.01); *H01Q 5/40* (2015.01); *H01Q 7/00* (2013.01); *H01Q 21/28* (2013.01); *H02J 5/005* (2013.01); *H04B 5/0031* (2013.01); *H04B 5/0037* (2013.01); *H04B 5/0087* (2013.01)

(58) Field of Classification Search
CPC ......... H02J 5/005; H04B 5/0031; H01Q 5/40; H01Q 7/00; H01Q 21/28; H01F 41/00; H01F 38/14

USPC ........................................................ 307/104
See application file for complete search history.

(56) References Cited

U.S. PATENT DOCUMENTS

| | | | |
|---|---|---|---|
| 2009/0029185 A1* | 1/2009 | Lee ..................... | H01F 41/046 428/573 |
| 2010/0156343 A1 | 6/2010 | Jung | |

(Continued)

FOREIGN PATENT DOCUMENTS

| | | |
|---|---|---|
| CN | 101438480 A | 5/2009 |
| EP | 2518904 A2 | 10/2012 |

(Continued)

OTHER PUBLICATIONS

Office Action dated Jul. 30, 2015 in Chinese Application No. 201310684439.6.

(Continued)

*Primary Examiner* — Jared Fureman
*Assistant Examiner* — Duc M Pham
(74) *Attorney, Agent, or Firm* — Saliwanchik, Lloyd & Eisenschenk

(57) ABSTRACT

Disclosed are a wireless power receiver and a method of manufacturing the same. The wireless power receiver includes a first coil to wirelessly receive power, a second coil to make communication, and a first magnetic substrate having first and second recesses spaced apart from each other. The first coil is disposed on the first recess of the first magnetic substrate, and the second coil is disposed on the second recess of a second magnetic substrate.

20 Claims, 4 Drawing Sheets

(51) Int. Cl.
*H01Q 21/28* (2006.01)
*H01Q 5/40* (2015.01)

(56) References Cited

U.S. PATENT DOCUMENTS

2012/0274148 A1    11/2012  Sung et al.
2013/0249302 A1*    9/2013  An ......................... H01F 41/14
                                                        307/104

FOREIGN PATENT DOCUMENTS

JP      2002-299138 A      10/2002
KR      1020100130480 A    12/2010

OTHER PUBLICATIONS

European Search Report dated Apr. 15, 2014 in European Application No. 13196341.5.

\* cited by examiner

WIRELESS POWER RECEIVER AND METHOD OF MANUFACTURING THE SAME

CROSS-REFERENCE TO RELATED APPLICATION

The present application claims priority under 35 U.S.C. §119(a) of Korean Patent Application No. 10-2012-0145645 filed on Dec. 13, 2012, which is hereby incorporated by reference in its entirety.

BACKGROUND

The embodiment relates to a wireless power transmission technology. More particularly, the embodiment relates to a wireless power receiver, capable of making communication with the outside thereof while wirelessly receiving power, and a method of manufacturing the same.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

Until now, the long-distance transmission using the magnetic induction, the resonance and the short-wavelength radio frequency has been used as the wireless energy transfer scheme.

Recently, a wireless power receiver capable of making communication with the outside thereof while wirelessly receiving power has been introduced.

However, according to the wireless power receiver of the related art, a frequency band used to wirelessly receive power is different from a frequency band used to make communication with the outside thereof, so that a frequency interference may occur.

Further, according to the wireless power receiver of the related art, in the process of wirelessly receiving power by using a magnetic field, many magnetic fields are discharged to the outside, so that power transmission efficiency may be degraded.

As a related art, there is Korea Unexamined Patent Publication No. 10-2010-0130480 titled "contactless power charging apparatus".

BRIEF SUMMARY

The embodiment provides a wireless power receiver, capable of improving the isolation between a coil to wirelessly receive power and a short-range communication antenna to make communication with the outside thereof and improving power transmission efficiency, and a method of manufacturing the same.

The embodiment provides a wireless power receiver capable of inhibiting distortion to be caused by an external shock and a method of manufacturing the same.

According to the embodiment, there is provided a wireless power receiver including a first coil to wirelessly receive power, a second coil to make communication, and a first magnetic substrate having first and second recesses, the first and second recesses spaced apart from each other. The first coil is disposed on the first recess of the first magnetic substrate, and the second coil is disposed on the second recess of a second magnetic substrate.

According to the embodiment, there is provided a method of manufacturing a wireless power receiver. The method includes forming first and second recesses on a first magnetic substrate, the first and second recesses spaced apart from each other, and forming first and second coils on the first and second recesses, respectively.

As described above, the wireless power receiver according to the embodiment may be embedded in a portable appliance such as a terminal.

DETAILED DESCRIPTION

Figure 1:
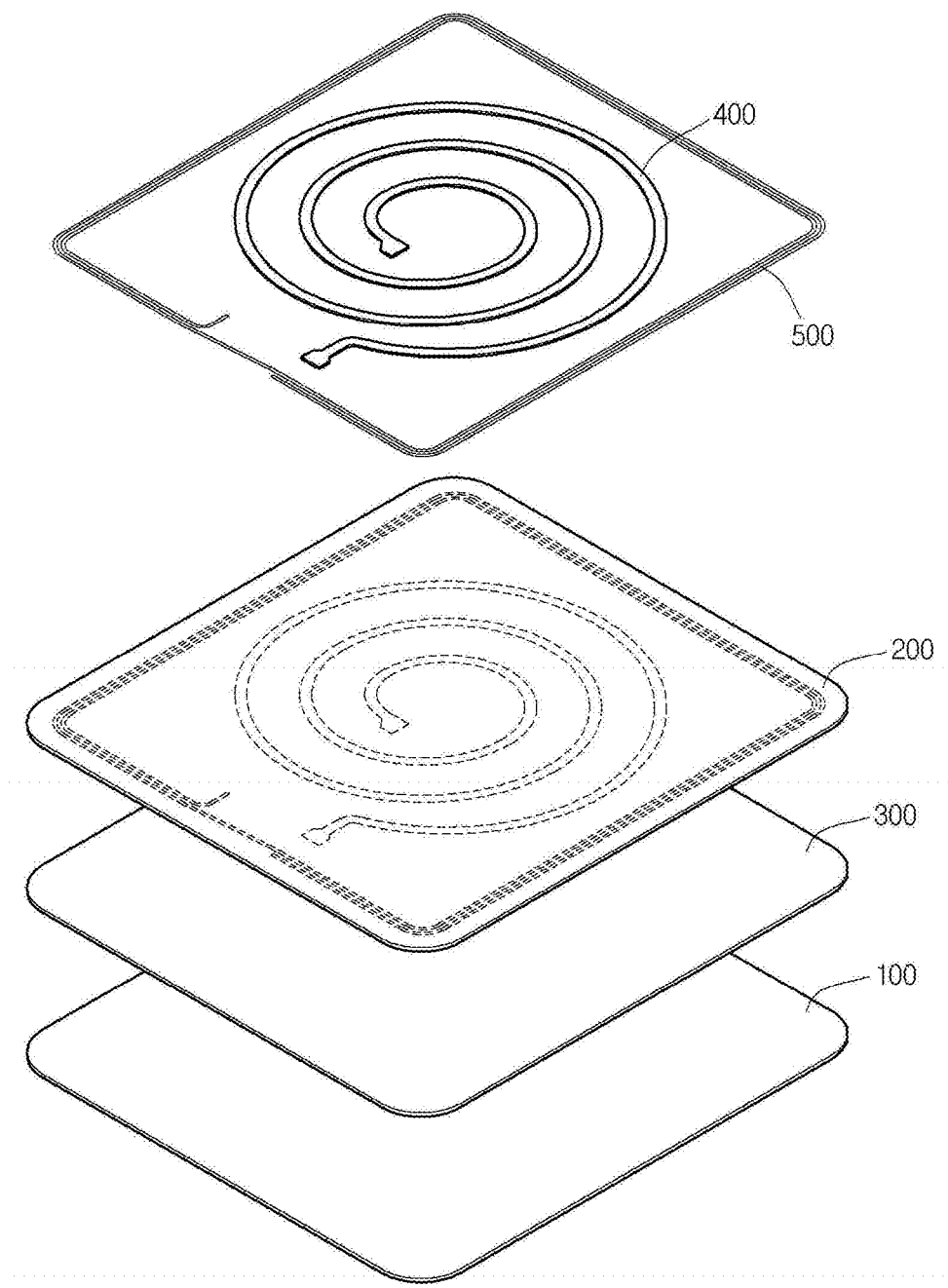
FIG. 1 is an exploded perspective view showing a wireless power receiver according to the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

Hereinafter the embodiment will be described with reference to accompanying drawings. The thickness and size of each layer shown in the drawings may be exaggerated, omitted or schematically drawn for the purpose of convenience or clarity. In addition, the size of elements does not utterly reflect an actual size.

Hereinafter, a conductive pattern may refer to the form of a conductive layer, or a structure formed through a patterning process. The conductive layer may refer to the substitute for the conductive pattern, or may refer to a structure formed through a patterning process, an etching process, an arrangement process, or a selectively plating process.

Hereinafter, a wireless power receiver according to the embodiment will be described with reference to FIGS. 1 to 3.

FIG. 1 is an exploded perspective view showing a wireless power receiver according to the embodiment. FIG. 2 is a perspective view showing the wireless power receiver according to the embodiment. FIG. 3 is a sectional view showing the wireless power receiver according to the embodiment.

A wireless power receiver 10 according to the embodiment may wirelessly receive power from a transmission side, for example, a wireless power transmitter. The wireless power receiver according to the embodiment may wirelessly receive power from the transmission side through an electromagnetic induction scheme.

The wireless power receiver 10 according to the embodiment may wirelessly receive power from the transmission side through a resonance scheme. In this case, the wireless power receiver 10 may further include a resonance coil (not shown) to receive power from the transmission side through the resonance scheme. A coil 400 may receive the power received by the resonance coil (not shown) through the electromagnetic induction scheme.

Both of the electromagnetic induction scheme and the resonance scheme are to receive power by using a magnetic field.

The wireless power receiver 10 according to the embodiment may be embedded in a terminal. The terminal according to the embodiment may include a portable terminal such as a smart phone or an MP3 player, but the embodiment is not limited thereto. In other words, the terminal according to the embodiment may include various electronic appliances to wirelessly receive power.

Figure 2:
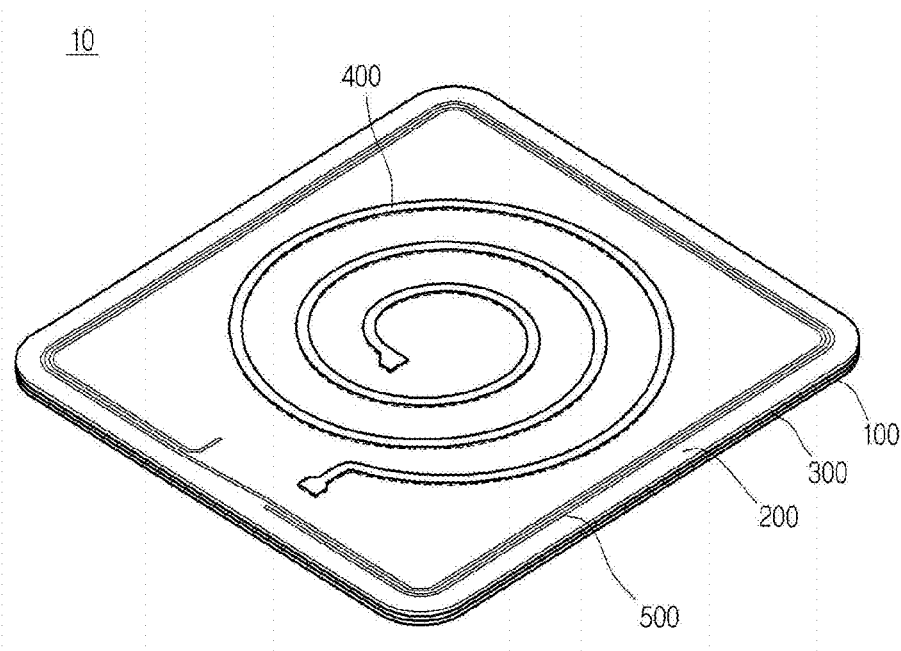
FIG. 2 is a perspective view showing the wireless power receiver according to the embodiment.
Figure 3:
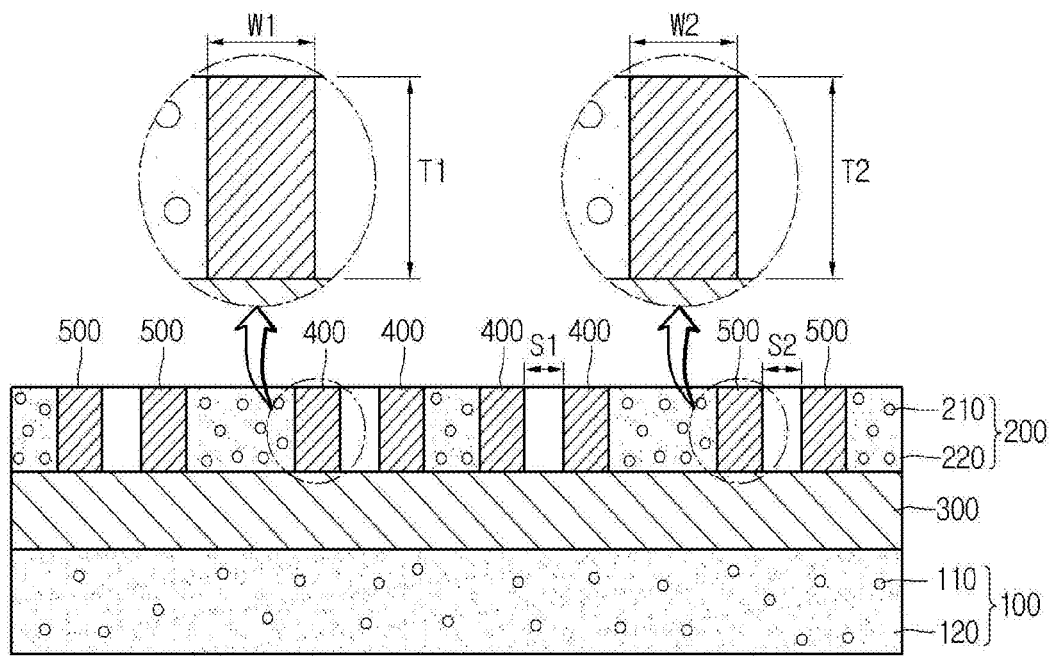
FIG. 3 is a sectional view showing the wireless power receiver according to the embodiment.

Referring to FIGS. 1 to 3, the wireless power receiver 10 may include a first magnetic substrate 100, a second magnetic substrate 200, an adhesive layer 300, the coil 400, and a short-range communication antenna 500. As shown in drawings, the short-range communication antenna 500 may include a coil. The short-range communication antenna 500 may have a square structure surrounding the coil 400.

The coil 400 may be named as a first coil, and the short-range communication antenna 500 may be named as a second coil, but the embodiment is not limited thereto.

The first magnetic substrate 100 may reduce the quantity of a magnetic field that may be discharged to the outside by changing the direction of the magnetic field received from the transmission side. Accordingly, the first magnetic substrate 100 may have a shielding effect. In detail, the first magnetic substrate 100 changes the direction of the magnetic field received from the transmission side toward a side direction so that the magnetic field may be more concentratedly transmitted to the coil 400. Accordingly, the power transmission efficiency can be improved.

The first magnetic substrate 100 may absorb a portion of the magnetic field received from the transmission side, which leaks to the outside, and discharge the absorbed magnetic field as heat. If the quantity of the magnetic field leaking to the outside is reduced, an influence harmful to a human body can be previously inhibited.

Referring to FIG. 3, the first magnetic substrate 100 may include a first magnetic substance 110 and a first support member 120.

The first magnetic substance 110 may have the form of particles or beads, and may include a ceramic material.

The first support member 110 may include thermosetting resin or thermoplastic resin.

The first magnetic substrate 100 may include a sandust-type magnetic substance. The sandust-type magnetic substance includes the composition of iron (Fe), silicon (Si), and aluminum (Al), and the composition ratios of iron (Fe), silicon (Si), and aluminum (Al) are 84%, 10%, and 6%, respectively, for the illustrative purpose. The composition ratio of the sandust-type magnetic substance may be varied so that the first magnetic substrate 100 may have an appropriate permeability. According to the embodiment, the composition ratio of the sandust-type magnetic substance may be varied so that the first magnetic substrate 100 may have the permeability in the range of about 40 to about 50. In this case, the permeability refers to the ratio between a magnetic flux density and the intensity of the magnetic field in a vacuum state.

The magnetic flux density is made when the magnetic substance is magnetized under the magnetic field.

The first magnetic substrate 100 may have the permeability corresponding to the frequency of power wirelessly received by the coil 400 from the transmission side. For example, according to the embodiment, the frequency of the power wirelessly received by the coil 400 may be in the range of about 110 KHz to about 205 KHz. Preferably, the permeability of the first magnetic substrate 100 may be in the range of about 40 to about 50.

Referring to FIG. 3, the second magnetic substrate 200 may include a second magnetic substance 210 and a second support member 220.

The second magnetic substance 210 may have the form of particles or beads, and may include a ceramic material.

The second support member 220 may include thermosetting resin or thermoplastic resin.

The second magnetic substrate 200 may include a sandust-type magnetic substance. The sandust-type magnetic substance includes the composition of iron (Fe), silicon (Si), and aluminum (Al). The composition ratios of iron (Fe), silicon (Si), and aluminum (Al) may be varied so that the second magnetic substrate 200 has appropriate permeability. According to the embodiment, the composition ratios may be varied so that the permeability of the second magnetic substrate 200 is in the range of about 100 to about 130.

The second magnetic substrate 200 may be disposed on one side of the first magnetic substance 100. According to the embodiment, the second magnetic substrate 200 may be disposed on an upper side of the first magnetic substrate 100.

The second magnetic substrate 200 may have a shape without parts on which the coil 400 and the short-range communication antenna 500 are disposed. In detail, the second magnetic substrate 200 may have recesses to receive the coil 400 and the short-range communication antenna 500. The coil 400 and the short-range communication antenna 500 may be disposed on the recesses. The details of the recesses will be described in detail.

According to the embodiment, the recesses of the second magnetic substrate 200 may have the same shape as that of a conductive layer or a conductive pattern in which the coil 400 and the short-range communication antenna 500 are formed.

According to the embodiment, the coil 400 may have the same thickness as that of the short-range communication antenna 500. The depth of the recess formed in the second magnetic substrate 200 may have the same as the thicknesses of the coil 400 and the short-range communication antenna 500.

As described above, at least a portion of the second magnetic substrate 200 is disposed between the coil 400 and the short-range communication antenna 500 to inhibit the frequency interference that may occur as the frequency used in the coil 400 is different from the frequency used in the short-range communication antenna 500, so that the extent of the frequency isolation can be improved. In detail, the second magnetic substrate 200 can inhibit the frequency interference that may occur as the frequency band of power received by the coil 400 is different from the frequency band of a communication signal of the short-range communication antenna 500.

In more detail, since the frequency band used in the communication signal of the short-range communication antenna 500 is different from the frequency band used in power received by the coil 400, at least a portion of the second magnetic substrate 200 having the permeability corresponding to the frequency band used for the communication signal of the short-range communication antenna 500 is disposed between the coil 400 and the short-range communication antenna 500, so that the communication signal of the short-range communication antenna 500 can be inhibited from being transmitted to the coil 400, thereby improving the extent of the frequency isolation between the short-range communication antenna 500 and the coil 400.

As described above, the second magnetic substrate 200 may have the permeability corresponding to the frequency used when the short-range communication antenna 500 makes communication with the outside. In other words, the permeability of the second magnetic substrate 200 may be different from that of the first magnetic substrate 100. According to the embodiment, the short-range communication antenna 500 may use the frequency band of about 13.56 MHz for the illustrative purpose. In this case, preferably, the permeability of the second magnetic substrate 200 may be in the range of about 100 to about 130.

The adhesive layer 300 may attach the first magnetic substrate 100 to the second magnetic substrate 200 so that the first magnetic substrate 100 can be securely combined with the second magnetic substrate 200. The thickness of the adhesive layer 300 can be adjusted. As the thickness of the adhesive layer 300 is adjusted, the extent that the magnetic field received by the coil 400 is directed to the short-range communication antenna 500 is reduced, so that the extent of the frequency isolation between the coil 400 and the short-range communication antenna 500 can be more improved.

The coil 400 may wirelessly receive power from the transmission side.

The coil 400 is formed by winding one conductive line several times to form a predetermined conductive layer or a predetermined conductive pattern. Although the coil 400 may have a spiral structure, the embodiment is not limited thereto, but the coil 400 may have various structures.

Referring to FIG. 3, the coil 400 may be designed to have a predetermined thickness T1 and a predetermined width W1. The coil 400 may be coiled to have a predetermined space S1 having a predetermined distance value. Since the coil 400 is formed in the recess where the second magnetic substrate 200 is removed, the predetermine space S1 between the adjacent conductive lines of coil 400 may be empty. In other words, the space S1 between the adjacent conductive lines of the coil 400 may have an empty space where the second magnetic substrate 200 is not disposed.

Opposite terminals of the coil 400 may be connected with a connection part (not shown). The connection part may transmit power, which is received by the coil 400, to a wireless power receiving circuit. The wireless power receiving circuit may include a rectifying circuit to rectify AC power to DC power and a smoothing circuit to remove a ripple component from the DC power and transmit the DC power having no the ripple component to a load. In this case, the load may include a battery to supply power for the operation of an electronic appliance, but the embodiment is not limited thereto.

The short-range communication antenna 500 may make communication with an external reader that can perform short-range wireless communication. In other words, the short-range communication antenna 500 may transmit or receive information together with the external reader.

Although the short-range communication antenna 500 may use various communication standards, it is preferred that the short-range communication antenna 500 uses a near filed communication (NFC). The NFC is a communication standard in which information can be wirelessly transceived within a short distance, and a contactless communication technology employing the frequency band of 13.56 MHz. The NFC is a communication standard that can be extensively utilized in the transmission of information of articles at a supermarket, or a general shop, the transmission of the travel information for a visitor, traffic, and an access control locking device, as well as payment.

The short-range communication antenna 500 may be arranged at the outside of the coil 400, and may include a conductive layer or a conductive pattern surrounding the coil 400.

Referring to FIG. 3, the short-range communication antenna 500 may be designed to have a predetermined thickness T2 and a predetermined width W2.

The short-range communication antenna 500 may be designed to have a predetermined space S2 having a predetermined distance value. Since the short-range communication antenna 500 is formed in the recess where the second magnetic substrate 200 is removed, the space S2 between the adjacent conductive lines of the short-range communication antenna 500 may be empty. In other words, the space S2 between the adjacent conductive lines of the short-range communication antenna 500 may have an empty space where the second magnetic substrate 200 is not disposed.

Hereinafter, a method of manufacturing the wireless power receiver according to the embodiment will be described with reference to FIGS. 4 to 9.

Hereinafter, the description of the method of manufacturing the wireless power receiver according to the embodiment will be made together with the description of FIGS. 1 to 3.

Figure 4:
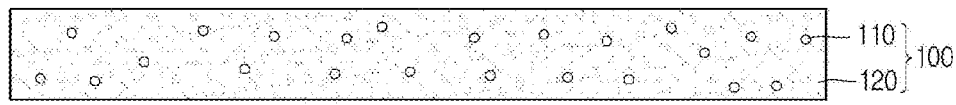
FIGS. 4 to 9 are sectional views showing a method of manufacturing the wireless power receiver according to the embodiment.

If the manufacturing process is started, the first magnetic substrate 100 is prepared as shown in FIG. 4. According to the embodiment, the thickness of the first magnetic substrate 100 may be in the range of about 0.1 mm to about 0.2 mm, for the illustrative purpose.

Figure 5:
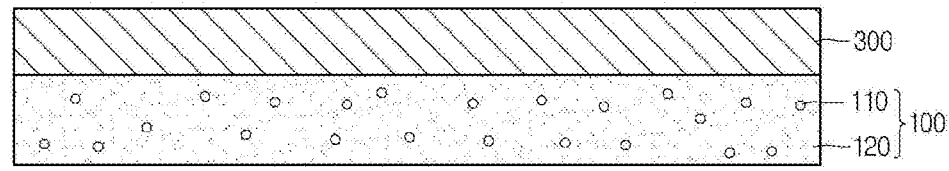

Next, referring to FIG. 5, in the state of FIG. 4, the adhesive layer 300 is disposed on a top surface of the first magnetic substrate 100. The adhesive layer 300, which is used to enhance the adhesive strength between the first magnetic substrate 100 and the second magnetic substrate 200, may include thermosetting resin, but the embodiment is not limited thereto.

Figure 6:
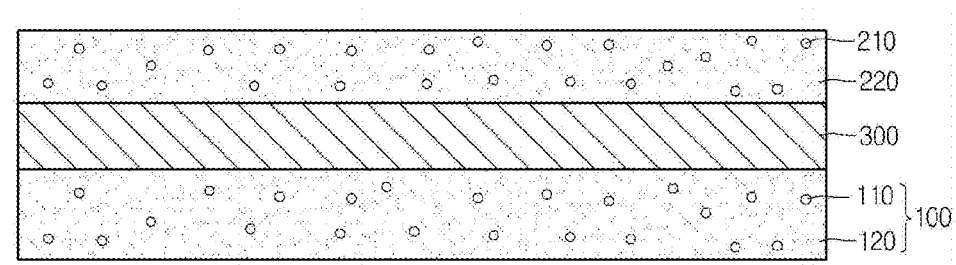

Next, referring to FIG. 6, in the state of FIG. 5, the second magnetic substrate 200 is disposed on the top surface of the adhesive layer 300. The first magnetic substrate 100 may be attached to the second magnetic substrate 200 through the adhesive layer 300. The second magnetic substrate 200 is prepared. According to the embodiment, the thickness of the second magnetic substrate 200 may be in the range of about 0.1 mm to about 0.2 mm, but the embodiment is not limited thereto.

Figure 7:
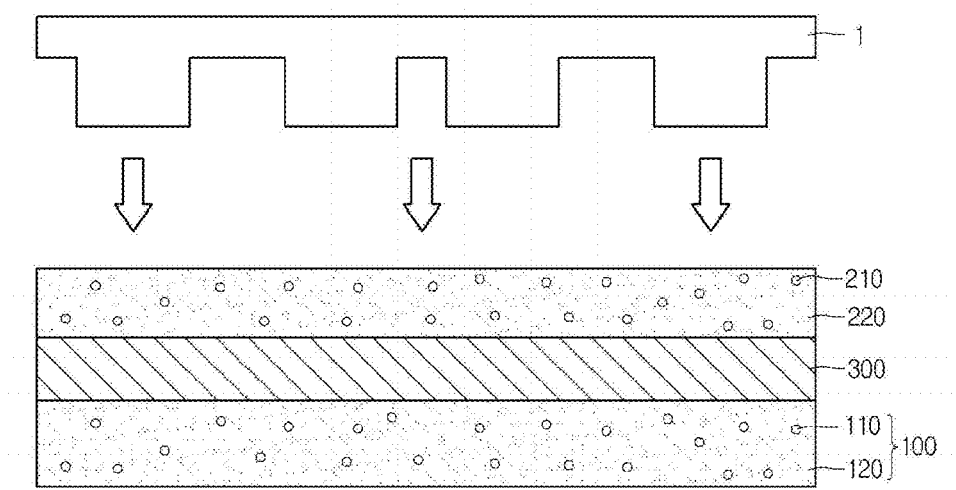

Next, as shown in FIG. 7, heat and pressure are applied to the second magnetic substrate 200 through a mold 1 in order to form recesses to receive the coil 400 and the short-range communication antenna 500. The mold 1 may have a plurality of protrusions corresponding to the positions of the coil 400 and the short-range communication antenna 500 to form the recess in the second magnetic substrate 200. According to the embodiment, the mold 1 may include an Al alloy, a Cu alloy, and cast iron for the illustrative purpose.

According to the embodiment, instead of applying heat and pressure through the mold 1, a laser may be irradiated to the second magnetic substrate 200 in order to form the recess to receive the coil 400 and the short-range communication antenna 500. The recesses may be formed through an excimer laser to irradiate the laser beam having the ultraviolet wavelength. The excimer laser may include a KrF excimer laser (krypton fluoride; the central wavelength of about 248 nm) or an ArF excimer laser (argon fluoride; the central wavelength of about 193 nm)

Hereinafter, the embodiment will be described with reference to FIG. 8.

Figure 8:
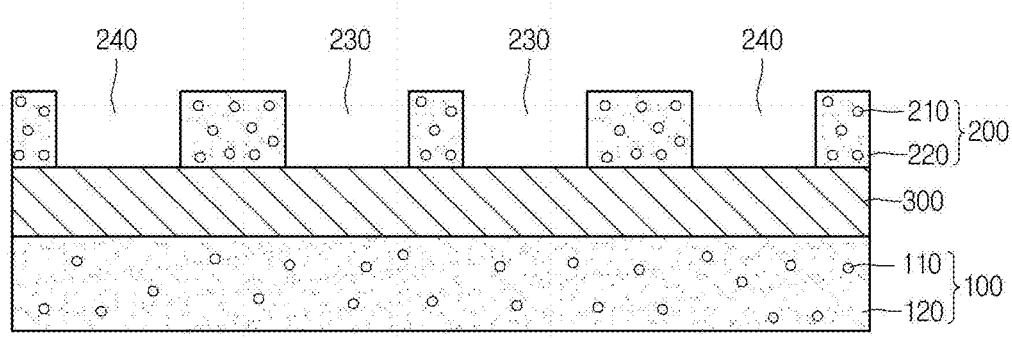

FIG. 8 shows the state of the second magnetic substrate 200 having a first recess 230 for the coil 400 and a second recess 240 for the short-range communication antenna 500 when the mold 1 is released from the second magnetic substrate 200.

Figure 9:
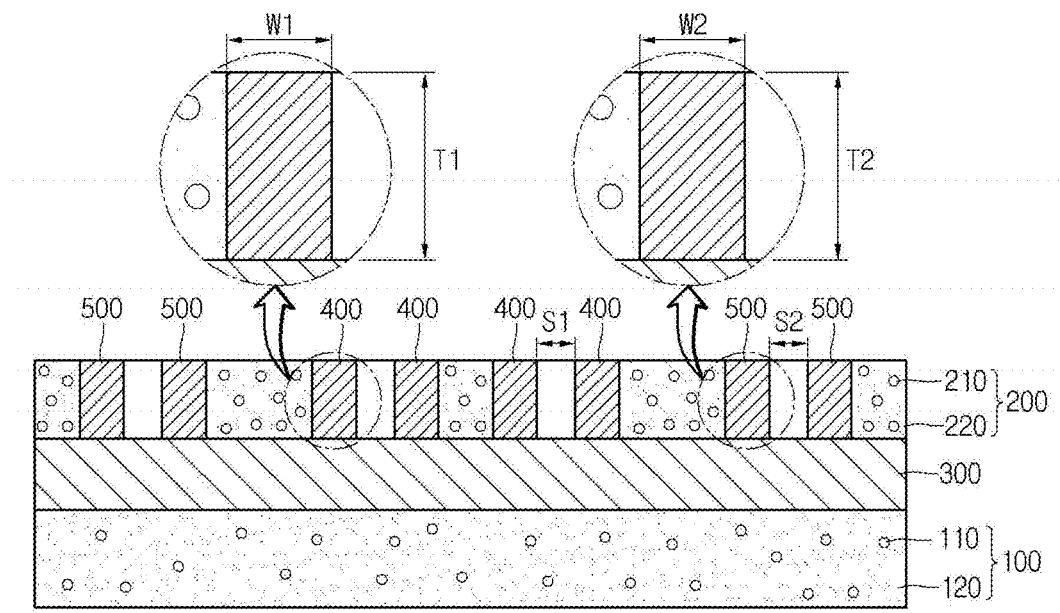

Thereafter, referring to FIG. 9, in the state of FIG. 8, the coil 400 is inserted into the first recess 230 of the second magnetic substrate 200, and the short-range communication antenna 500 is inserted into the second recess 240 of the second magnetic substrate 200. The coil 400 and the short-range communication antenna 500 having a predetermined conductive pattern through the insertion process are disposed on the first and second recesses 230 and 240 of the second magnetic substrate 200, respectively.

Therefore, at least a portion of the second magnetic substrate 200 may be disposed between the coil 400 and the short-range communication antenna 500. An empty space having no second magnetic substrate 200 may be formed between the adjacent conductive lines of the coil 400 and between the adjacent conductive lines of the short-range communication antenna 500.

As described above, at least a portion of the second magnetic substrate 200 is disposed between the coil 400 and the short-range communication antenna 500 to inhibit the frequency interference that may occur as the frequency used in the coil 400 is different from the frequency used in the short-range communication antenna 500, so that the extent of the frequency isolation can be improved between the coil 400 and the short-range communication antenna 500.

According to the embodiment, processes of inserting the coil 400 and the short-range communication antenna 500 into the first recess 230 and the second recess 240 of the second magnetic substrate 200 may be used through a plating process.

In detail, the plating process may refer to a process to fill a metallic material into the first and second recesses 230 and 240 of the second magnetic substrate 200. In this case, the used metallic material may include one selected from the group consisting of Cu, Ag, Sn, Au, Ni, and Pd. Preferably, the used metallic material may include Cu. The plating process may include one of an electroless plating scheme, an electrolytic plating scheme, a screen printing scheme, a sputtering scheme, an evaporation scheme, an ink jetting scheme, and a dispensing scheme, or the combination thereof.

According to the embodiment, a conductor, which is subject to an etching process allowing the coil 400 and the short-range communication antenna 500 to have a predetermined conductive pattern, may be inserted into the first and second recesses 230 and 240.

According to the embodiment, the depth of the first recess 230 formed in the second magnetic substrate 200 may be equal to or smaller than the thickness of the coil 400.

Similarly, the depth of the second recess 240 may be equal to the thickness of the short-range communication antenna 500. If the depth of the second recess 240 is smaller than the thickness of the short-range communication antenna 500, a portion of the short-range communication antenna 500 may protrude out of the top surface of the second magnetic substrate 200 upwardly.

According to the embodiment, after forming the coil 400 and the short-range communication antenna 500 on the first and second recesses 230 and 240 of the second magnetic substrate 200, the second magnetic substrate 200 may be attached to the first magnetic substrate 100 by using the adhesive layer 300, but the embodiment is not limited thereto.

Although the first magnetic substrate 100 may be named as the second magnetic substrate, or the second magnetic substrate 200 may be named as the first magnetic substrate as described above, the embodiment is not limited thereto.

According to the embodiment, the second magnetic substrate 200 is attached onto the first magnetic substrate 100, and the coil 400 and the short-range communication antenna 500 are disposed on the second magnetic substrate 200 having the permeability different from that of the first magnetic substrate 100, thereby improving the isolation, so that the power transmission efficiency can be improved.

In addition, according to the embodiment, the second magnetic substrate 200 is attached onto the first magnetic substrate 100, and the coil 400 and the short-range communication antenna 500 are disposed on the second magnetic substrate 200 having the permeability different from that of the first magnetic substrate 100, which is less affected by an external shock. Accordingly, the phenomenon such as distortion can be inhibited.

Meanwhile, any other various effects will be directly and implicitly described below in the description of the embodiment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power receiver comprising:
    a first coil to wirelessly receive power;
    a second coil to make communication;
    a first magnetic substrate having first and second recesses, the first and second recesses spaced apart from each other; and
    a second magnetic substrate;
    wherein the first coil is disposed on the first recess of the first magnetic substrate, and the second coil is disposed on the second recess of the first magnetic substrate;

wherein the first magnetic substrate has a permeability different from a permeability of the second magnetic substrate, and wherein the second magnetic substrate has a permeability corresponding to a frequency band used for a signal of the second coil.

2. The wireless power receiver of claim 1, wherein the first coil comprises at least one first conductive pattern, and the second coil comprises at least one second conductive pattern.

3. The wireless power receiver of claim 2, wherein a space between adjacent first conductive patterns is empty.

4. The wireless power receiver of claim 2, wherein a space between adjacent second conductive patterns is empty.

5. The wireless power receiver of claim 2, wherein a portion of a side surface of an outermost conductive pattern of the at least one first conductive pattern makes contact with a first side surface of the second magnetic substrate.

6. The wireless power receiver of claim 5, wherein a portion of a side surface of an outermost conductive pattern of the at least one second conductive pattern makes contact with a second side surface of the second magnetic substrate, the second side surface of the second magnetic substrate being opposite to the first side surface of the second magnetic substrate.

7. The wireless power receiver of claim 1, wherein the first coil has a thickness equal to a first depth of the first recess.

8. The wireless power receiver of claim 1, wherein the second coil has a thickness equal to a second depth of the second recess.

9. The wireless power receiver of claim 1, wherein a portion of the second coil protrudes upward from the first magnetic substrate.

10. The wireless power receiver of claim 1, wherein the second coil surrounds the first coil.

11. The wireless power receiver of claim 1, wherein the first magnetic substrate is disposed between the first and second coils.

12. The wireless power receiver of claim 1, wherein the first coil has a spiral structure.

13. The wireless power receiver of claim 1, wherein the second coil has a square structure.

14. The wireless power receiver of claim 1, further comprising:

a second magnetic substrate under the first magnetic substrate; and an adhesive layer between the first and second magnetic substrates.

15. The wireless power receiver of claim 14, wherein the first and second magnetic substrates comprise particles.

16. The wireless power receiver of claim 14, wherein the first and second magnetic substrates comprise a magnetic substance having a sandust-type structure.

17. The wireless power receiver of claim 14, wherein the first magnetic substrate has a permeability greater than a permeability of at least the second magnetic substrate.

18. The wireless power receiver of claim 17, wherein the permeability of the first magnetic substrate is in a range of about 40 to about 50, and the permeability of the second magnetic substrate is in a range of about 100 to about 130.

19. A method of manufacturing a wireless power receiver, the method comprising:

forming first and second recesses on a first magnetic substrate, the first and second recesses spaced apart from each other;

forming a first coil on the first recess;

forming a second coil on the second recess;

wherein the first magnetic substrate has a permeability different from a permeability of a second magnetic substrate of the wireless power receiver, and wherein the second magnetic substrate has a permeability corresponding to a frequency band used for a signal of the second coil.

20. The method of claim 19, further comprising attaching a second magnetic substrate to the first magnetic substrate by using an adhesive layer, before forming the first and second recesses.

* * * * *